United States Patent [19]

Ong et al.

[11] Patent Number: 4,820,601
[45] Date of Patent: Apr. 11, 1989

[54] PHOTORESPONSIVE IMAGING MEMBERS WITH PROTECTIVE COPOLYURETHANE OVERCOATINGS

[75] Inventors: Beng S. Ong; Dasarao K. Murti, both of Mississauga; John R. C. Fuller, Oakville, all of Canada

[73] Assignee: Xerox Corporation, Stamford, Conn.

[21] Appl. No.: 150,871

[22] Filed: Feb. 1, 1988

[51] Int. Cl.[4] ............................................. G03G 5/14
[52] U.S. Cl. .................................... 430/58; 430/59; 430/900; 430/66; 528/76; 528/83
[58] Field of Search ........................... 430/58, 59, 900; 528/76, 83

[56] References Cited

U.S. PATENT DOCUMENTS

| | | |
|---|---|---|
| 3,108,092 | 10/1963 | Russell et al. |
| 3,451,969 | 6/1969 | Argabright . |
| 3,645,976 | 2/1972 | Suzuki et al. ............... 528/83 X |
| 3,928,034 | 12/1975 | Regensburger ............... 430/58 |
| 4,007,043 | 2/1977 | Stolka et al. ................ 430/58 |
| 4,063,947 | 12/1977 | Pochan et al. ............... 430/58 |
| 4,075,012 | 2/1978 | Turner et al. ............... 430/58 |
| 4,203,764 | 5/1980 | Tosaka et al. ............... 430/67 |
| 4,264,695 | 4/1981 | Kozima et al. ............ 430/900 X |
| 4,535,042 | 8/1985 | Kitayama et al. .......... 430/900 X |
| 4,562,132 | 12/1985 | Ong et al. .................. 430/59 |

FOREIGN PATENT DOCUMENTS 801023 9/1958 United Kingdom ................. 528/76

Primary Examiner—Roland E. Martin
Attorney, Agent, or Firm—E. O. Palazzo

[57] ABSTRACT

An imaging member comprised of a photoconductive layer, and a protective copolyurethane overcoating of the formula:

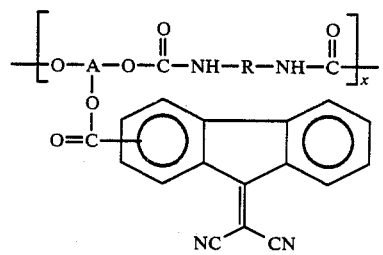

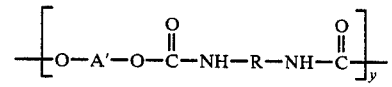

wherein A is a trivalent group; A' is a bivalent group; R is selected from the group consisting of alkylene, substituted alkylene, arylene, and substituted arylene; x and y are number mole fractions of from about 0.05 to about 0.95 subsequent to the provision that the sum of x+y is equal to 1.0. Also disclosed are processes for the preparation of the aforementioned copolyurethanes.

30 Claims, 7 Drawing Sheets

PHOTORESPONSIVE IMAGING MEMBERS WITH PROTECTIVE COPOLYURETHANE OVERCOATINGS

BACKGROUND OF THE INVENTION

This invention is generally directed to imaging members, and more specifically the present invention relates to the selection of certain novel polyurethanes which function as protective overcoatings for photoresponsive imaging members, especially inorganic imaging members. In one embodiment, the present invention relates to an imaging member comprised of an inorganic photoconductive composition, and coated thereover certain polyurethane polymers. Also, in another embodiment of the present invention, there are provided imaging members comprised of a photogenerating layer, a hole transport layer, and thereover as a protective overcoating specific polyurethane polymers. The aforementioned imaging members are useful in electrophotographic printing and imaging processes, and in particular, can be selected for the generation of latent images in electrostatic imaging systems.

The polyurethanes of the present invention, when selected for the imaging members disclosed herein, perform a variety of functions inclusive of providing protection for the aforementioned members from abrasive, physical, and chemical contamination. Accordingly, thus for example, the specific overcoating polyurethanes of the present invention permit the resulting imaging member to be resistant to ozone and other chemical substances produced by corona charging devices. Also, the polyurethane overcoatings of the present invention substantially eliminate undesirable scratching of the imaging members involved, and further these coatings can function as release materials permitting the excellent removal and transfer of toner images. Furthermore, the polyurethane coatings of the present invention can be easily formulated as discrete layers and remain essentially nonreactive to the ink/solvent formulations utilized for certain liquid ink xerographic development processes. Moreover, the protective overcoatings of the present invention are nontoxic and are, therefore, inert to users of the device. Additionally, the protective polyurethane overcoatings are not sensitive to changes in many environmental conditions (humidity and temperature), thus ensuring the electrical performance of the protected imaging members for numerous imaging cycles.

It is known that the application of protective coatings to certain photoconductive materials, particularly inorganic photoconductive materials, is designed primarily for the purpose of extending the useful life of the resulting devices. Generally, for these coatings to provide the desired protection they should possess certain mechanical properties, and are usually applied in a substantially uniform thickness. Additionally, the coating material should be selected so as to not adversely effect the photoelectric properties of the photoreceptor, for example, the coating should not appreciably inject charges in the dark. The protective coatings should also not conduct laterally on the overcoated surface thereof. Further, in some applications the coating must be transparent, and possess a dark resistivity at least equal to the dark resistivity of the photoconductive material. For example, photoconductive materials such as selenium have a resistivity in the dark of $10^{10}$ to $10^{12}$ ohm-cm, thus the dark resistivity of the protective coating should usually be in this range when it is used as a protectant for selenium. In addition, the coatings should not be sensitive to changes in humidity and certain temperature ranges otherwise the photoelectric properties of the protected photoreceptors can be altered.

With regard to vitreous selenium, one of the most widely used photoconductive materials, it suffers from two serious defects, namely, its spectral response is somewhat toward the blue or near ultraviolet, and the preparation of uniform films of vitreous selenium has required highly complex processes wherein critical parameters are involved. Accordingly, from a commercial economic aspect, it is important that xerographic selenium devices be utilized for numerous imaging cycles. The overcoatings of the present invention enable this and other objectives to be achieved.

Deterioration by mechanical abrasion attendant to the developing and the cleaning processes, wherein in one cleaning process a rapidly rotating brush contacts the photoconductive surface for the purpose of removing therefrom any residual developer particles adhering thereto subsequent to the transfer step, has been observed in selenium. In addition to mechanical abrasion, the selenium photoreceptor may be subjected to intense heat, which over a period of time adversely effects its photoconductivity. Accordingly, and for other reasons inclusive of preventing crystallization of selenium upon exposure to chemical vapors, various protective coatings, or overcoatings have been applied to selenium devices. Thus, there is described in U.S. Pat. No. 3,397,982 an electrostatic member comprised of a photoconductive layer including an inorganic glass material, and thereover an overcoating comprised of various oxides, such as germanium oxides, the oxides of vanadium, and silicon dioxide.

Additionally, in U.S. Pat. No. 2,886,434 there are disclosed processes for the protection of selenium photoconductive substances with a thin transparent film of a material having electrical characteristics equal to selenium. Examples of materials disclosed in the U.S. Pat. No. 2,886,434 as a protective layer for selenium include zinc sulfide, silca, various silicates, alkaline earth fluorides, and the like. Furthermore, there is disclosed in U.S. Pat. No. 2,879,360 a photoconductor comprising a support substrate, a layer of photoconductive material, and as a protectant a thin film of silicon dioxide superimposed upon the photoconductive layer.

Also, there are illustrated in the prior art photoresponsive devices comprised of a conductive substrate overcoated with a hole injecting layer, which in turn is overcoated with a hole transport layer, followed by a carrier generating layer, and an insulating organic resin as a top coating. These devices have been found to be very useful in various imaging systems, and have the advantage that high quality images are obtained with the overcoating acting primarily as a protectant. Another similar overcoated photoresponsive device is comprised of a conductive substrate layer, a generating layer, and a transport layer. In such devices, the generating layer can be overcoated on the transport layer, or the transport layer may be overcoated on the generating layer. Examples of such devices are described in U.S. Pat. No. 4,265,990, the disclosure of which is totally incorporated herein by reference.

Additionally, there are illustrated in U.S. Pat. No. 4,423,131, the disclosure of which is totally incorporated herein by reference, entitled Photoresponsive Devices Containing Polyvinylsilicate Coatings, improved photoresponsive imaging members with a protective overcoating top layer of a crosslinked polyvinylsilicate resulting from the reaction of polysilicic acid with a polyvinyl alcohol with a number average molecular weight of from about 10,000 to about 100,000.

Several of the above-described overcoated organic photoresponsive devices are not effectively protected after extended usage, and in some instances the imaging properties thereof are adversely effected subsequent to a few imaging cycles. More specifically, with these devices the properties of the top overcoating material, or the properties of the other layers are usually adversely effected by ozone and other contaminants present in the environment by the developing compositions which contact the photoresponsive device for the purpose of rendering the image visible, and mechanical abrasion during cycling. Accordingly, images of low quality, or no images whatsoever are produced depending upon the extensiveness of the damage caused to the layers of the photoconductive device selected. Furthermore, in some instances, the toner materials employed do not sufficiently release from the photoresponsive surface, leaving unwanted toner particles thereon causing them to be subsequently embedded into, or transferred from the imaging surface in later imaging steps thereby resulting in undesirable images of low quality and/or high background. Also, in some instances, the dried toner particles adhere to the imaging member and print out as background areas. This can be particularly troublesome when known silicone resins or elastomeric polymers are employed as overcoating materials for their melted toner release characteristics since any low molecular weight components contained in these polymers can migrate to the surface of the silicone polymer layer, and act as an adhesive for dry toner particles brought in contact therewith during image development. There thus results undesirable high background areas in the final image since toner particles together with the developed images are effectively transferred to the receiving sheet.

Furthermore, illustrated in U.S. Pat. No. 4,562,132, the disclosure of which is totally incorporated herein by reference, entitled Photoresponsive Imaging Members Containing Electron Transport Overcoatings, are imaging members comprised of a supporting substrate, a hole transport layer comprised of an arylamine hole transporting compound dispersed in an inactive resinous binder, a photogenerating layer comprised of a photogenerating pigment optionally dispersed in a resinous binder, and as a protective topcoating an electron transporting compound of the following formula dispersed in a resinous binder

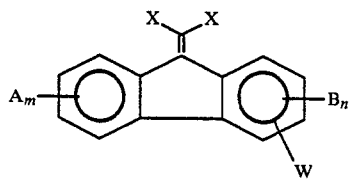

where X is cyano or alkoxycarbonyl groups, A and B are electron withdrawing groups, m is a number of from 0 to 2, n is the number 0 or 1, and W is an electron withdrawing group selected from the group consisting of acyl (COR), alkoxycarbonyl (COOR), alkylaminocarbonyl (CONHR), and derivatives thereof.

Moreover, illustrated in copending application U.S. Ser. No. 882,117, entitled Phoresponsive Imaging Members With Electron Transport Overcoatings, the disclosure of which is totally incorporated herein by reference, are imaging members similar to those of the present application with the exception that there is selected for the overcoating of imaging members of the present invention certain novel copolyurethane overcoatings. More specifically, there are described in this copending application inorganic photoresponsive imaging members having incorporated herein as protective overcoatings electron transporting polycondensation polymers derived from the polycondensation of 2,2-bis(hydroxymethyl)butyl 9-dicyanomethylene-fluorene-4-carboxylate, and diisocyanate. Also disclosed in the copending application are layered photoresponsive imaging members comprised of a supporting substrate, a photoconductive layer, an arylamine hole transport layer, and a protective electron transporting overcoating layer comprised of the aforementioned polyurethane polymers. In addition, the electron transport polyurethane polymers of the copending application are useful as the top overcoating for positive-charging layered photoresponsive devices comprised of a supporting substrate, a hole transport layer, and a photoconductive layer, and wherein the polymers are of the following formula.

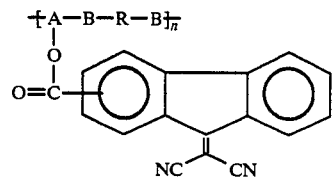

wherein A is a trivalent linkage; B is a functional group such as an ester (—OCO—), a carbonate (—OCOO—) or a carbamate (—OCONH—); R is a bivalent group, and n represents a certain number of repeating units.

The copolyurethane overcoatings of the present invention are somewhat similar to the aforementioned polyurethane coatings, and further the aforementioned copolyurethanes have enhanced flexibility characteristics as compared to those polyurethanes illustrated in the U.S. Pat. No. 4,562,132. More specifically, the copolyurethanes of the present invention contain therein certain highly flexible segments enhancing its flexibility characteristics which is of particular importance when these polymers are selected as protective overcoatings for belt photoconductors, and moreover the copolyurethanes of the present invention are useful as a protectant for extended time periods. Furthermore, the presence of the soft flexible segments in the copolyurethanes of the present invention greatly improve their solubilities in common coating solvents such as aromatic hydrocarbons, tetrahydrofuran, chlorinated hydrocarbons, and the like, thereby enabling the coating process to be accomplished in a variety of solvents by different coating techniques, such as dip coating, spray coating, and the like. More importantly, the incorporation of the flexible segments into the polyurethane structure renders the synthesis of higher molecular-weight polyurethanes feasible, thus affording tough, highly durable polyurethanes for protective overcoating application.

Other prior art includes U.S. Pat. Nos. 4,474,865, which describes improved photoresponsive imaging members with electron transporting components containing specific dicyano fluoro ester moieties; 3,928,034, which illustrates the incorporation of electron transporting moieties chemically attached to polymers, reference columns 7 and 8; and 4,007,043; 4,063,947; 4,075,012; and 3,896,184. Also of interest are U.S. Pat. Nos. 3,108,092; 3,451,969; 4,063,947; and 4,203, Patent Publication No. 7606525. Of particular interest are U.S. Pat. No. 4,063,947 and Holland No. 7606525, which disclose imaging members with electron transport compounds, reference column 3, line 57, to column 4, line 30, of the U.S. Pat. No. 4,063,947.

While the above-described imaging members disclosed, particularly those of the pending application, are suitable for their intended purposes, there continues to be a need for improved protective overcoatings for incorporation into inorganic and organic imaging members. More specifically, there continues to be a need for protective overcoatings for inorganic imaging members, inclusive of selenium, and selenium alloys, which simultaneously function as charge transporting components enabling the resulting photoresponsive imaging members to be useful in xerographic imaging processes. Additionally, there continues to be a need for overcoatings which possess excellent toner release properties, and are impermeable to chemical materials produced by corona charging devices, and wherein the overcoatings selected are soluble in a variety of solvents thereby permitting improved coatability, and allowing economical spray and dip coating processes to be selected. There also continues to be a need for insulating protective overcoatings which are not conductive to charges applied by a corona charging device. Furthermore, there remains a need for protective overcoatings which are mechanically strong and durable while simultaneously being insensitive to the effect of humidity. Also, there is a need for heat resistant overcoatings for inorganic photoresponsive imaging members which are capable of protecting these members from direct exposure to heat without adversely effecting their imaging performance. There also remains a need for protective overcoatings which prevent the escape of toxic materials, especially inorganic materials such as arsenic and tellurium from photoreceptor imaging members. Moreover, there is a need for protective overcoatings that will prevent photoconductors such as selenium from cyrstallization upon exposure to chemical vapors. Further, there continues to be a need for new protective overcoatings for inorganic photoconductive members inclusive of members comprised of selenium and selenium alloys. Also, there is a need for reliable single component protective overcoatings for layered imaging members, which coatings have several desirable characteristics including toughness and high durability.

SUMMARY OF THE INVENTION

It is an object of the present invention to provide an improved photoresponsive imaging member with many of the above noted advantages.

In a further object of the present invention there are provided copolyurethane overcoatings for photoresponsive imaging members, which overcoatings are chemical, heat and abrasion resistant.

In another object of the present invention there are provided inoganic photoresponsive imaging members with a photogenerating composition, and coated thereover as a protective overcoating certain mechanically strong copolyurethanes.

In yet a further object of the present invention there are provided layered photoresponsive imaging members containing as top protective overcoatings specific copolyurethanes, which overcoatings are insulating and not conductive or leaky to charges applied by a corona charging device.

In still another object of the present invention there are provided photoresponsive imaging members, inclusive of those comprised of selenium and selenium alloys, with protective overcoating copolyurethanes, which members are useful for generating electrostatic latent images, particularly colored images in xerographic imaging or printing processes.

Another object of the present invention resides in the provision of humidity insensitive copolyurethane overcoatings for inorganic photoresponsive imaging members.

Additionally, another object of the present invention resides in the provision of single component polymeric overcoatings for photoreceptors, which overcoatings are environmentally safe, and are inert to the users of the devices.

Furthermore, in another object of the present invention there are provided novel copolyurethanes, which may be selected as protective overcoatings for imaging members, which copolyurethanes are soluble in a variety of different solvents permitting improved coatability, and allowing the utilization of spray or dip coating processes.

Moreover, in another object of the present invention there are provided inorganic photoconductive imaging members, inclusive of those comprised of selenium and selenium alloys, with the protective copolyurethane overcoatings illustrated herein, which members can be utilized for an extended number of imaging cycles exceeding, for exmaple 50,000.

These and other objects of the present invention are accomplished by the provision of photoresponsive imaging members having incorporated therein as protective overcoatings certain novel copolyurethanes. More specifically, in one embodiment of the present invention there are provided inorganic photoresponsive imaging members having incorporated therein as protective overcoatings certain novel copolyurethanes of the formula

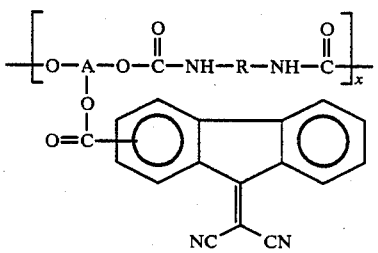

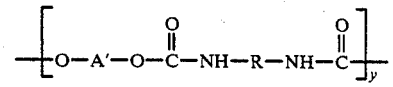

wherein A is a trivalent group such as dimethylene alkyl group, or triethylene amine; A' is a bivalent group such as alkylene, arylene, polyether segments, and the derivatives thereof; R is selected from the group consisting of alkylene, arylene, and the derivatives thereof; x and y are number mole fractions of from about 0.05 to about 0.95 such that $x+y=1.0$.

Examples of copolyurethanes selected as protective overcoatings include those as represented by the following Formulas I, II and III:

such as methyl, ethyl, propyl, butyl, pentyl, dodecyl, and the like; while examples of aryl substituents are those with from about 6 to about 24 carbon atoms, such as phenyl and naphthyl.

Specifically, examples of copolyurethane overcoating polymers selected for the imaging members illustrated herein include those represented by the formulas illustrated in FIGS. 1 to 10, wherein the substituents such as x and y are as defined herein.

The copolyurethanes of the present invention can be

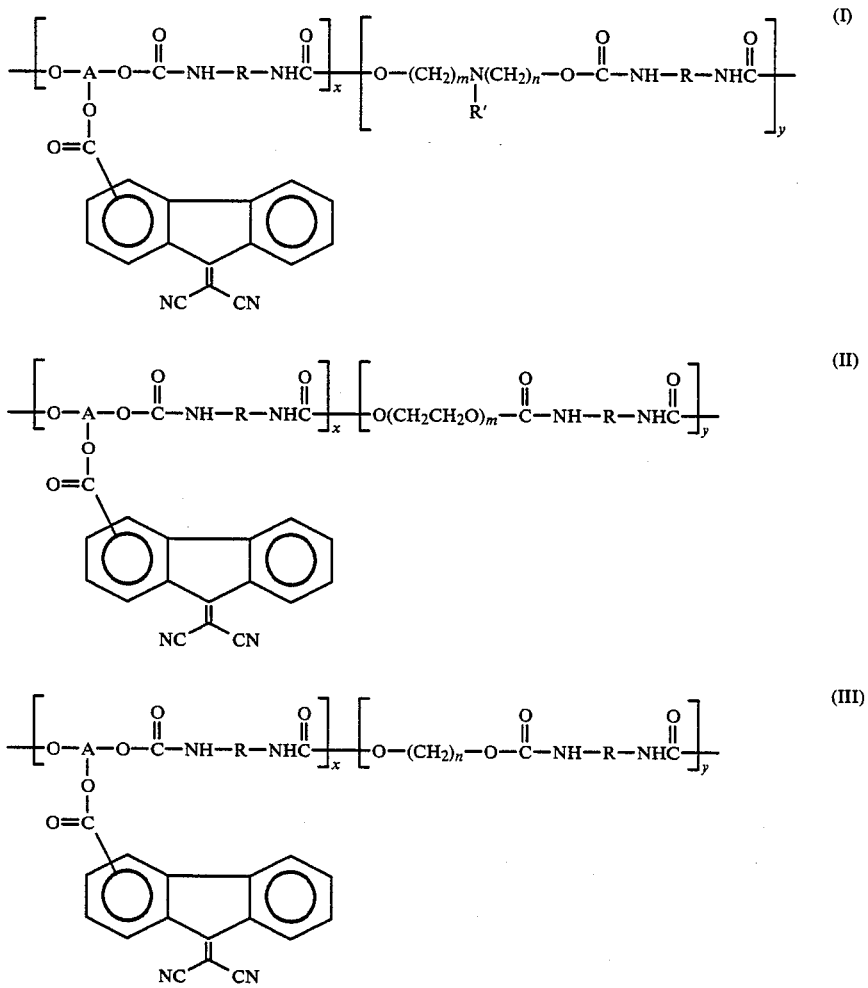

wherein A is a trivalent group; R is a bivalent group such as alkylene, arylene, substituted alkylene or substituted arylene group such as methylene, dimethylene, trimethylene, tetramethylene, phenylene, tolylene, and the like; R' is an alkyl, or substituted alkyl substituent, an aryl or substituted aryl substitutent; x and y represent number mole fractions of from 0.05 to about 0.95 such that $x+y=1.0$; and m and n are positive integers of from 1 to about 20. Examples of alkyl substituents include those with from about 1 to about 25 carbon atoms, synthesized, reference Reaction Scheme 1 that follows, by the reaction of the dihydroxy-functionalized monomer (1a) and a diol (2) such as ethylene glycol, diethylene glycol, octanediol, and the like, with a slight excess of diisocyanate (3) in an inert reaction solvent medium at a temperature usually below 100° C., and preferably between 50° C. to 85° C. In general, a suitable catalyst such as tertiary amines, dibutyltin diacetate or dibutyltin dilaurate is employed to increase the rate of polymerization.

SCHEME 1

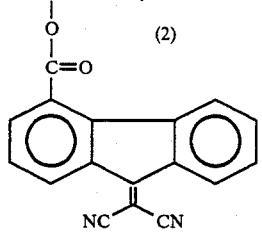

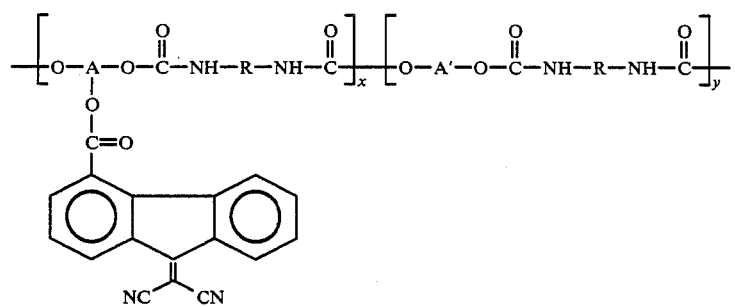

wherein A, A', x, y, and R are as defined hereinbefore.

Examples of suitable solvents for the above polymerization reaction include ethyl acetate, tetrahydrofuran, dioxane, dimethyl sulfoxide, dimethyl acetamide, and dimethylformamide. Also, the aforesaid reaction is generally accomplished in a period of from about 2 to about 24 hours depending on the nature of the reagents and reaction conditions.

Examples of diisocyanates that may be selected for the preparation of protective overcoating copolyurethanes include methane diisocyanate, 1,2-ethane diisocyanate, 1,3-propane diisocyanate, 1,6-hexane diisocyanate, 1,4-cyclohexane diisocyanate, 1,4-dimethylenecyclohexane diisocyanate, benzene diisocyanate, toluene diisocyanates, methylene bis(4-phenyl isocyanate), and the like.

Specific examples of the dihydroxy-functionalized monomer (1a) selected for the preparation include

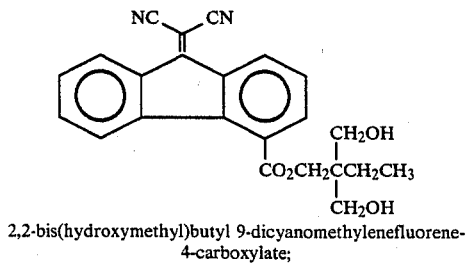

2,2-bis(hydroxymethyl)butyl 9-dicyanomethylenefluorene-4-carboxylate;

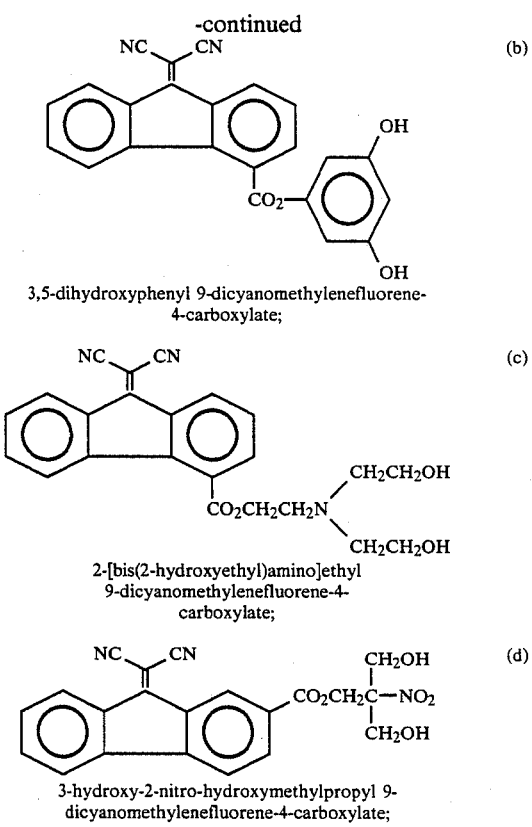

3,5-dihydroxyphenyl 9-dicyanomethylenefluorene-4-carboxylate;

2-[bis(2-hydroxyethyl)amino]ethyl 9-dicyanomethylenefluorene-4-carboxylate;

3-hydroxy-2-nitro-hydroxymethylpropyl 9-dicyanomethylenefluorene-4-carboxylate;

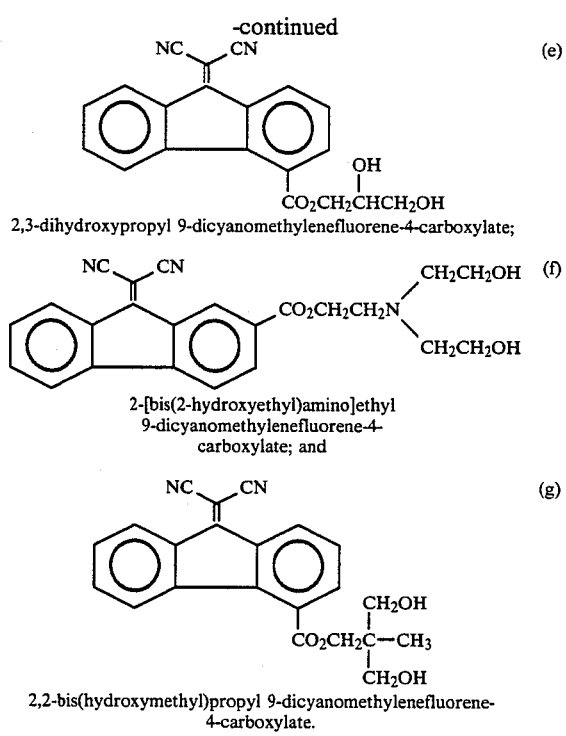

-continued 2,3-dihydroxypropyl 9-dicyanomethylenefluorene-4-carboxylate; (e)

2-[bis(2-hydroxyethyl)amino]ethyl 9-dicyanomethylenefluorene-4-carboxylate; and (f)

2,2-bis(hydroxymethyl)propyl 9-dicyanomethylenefluorene-4-carboxylate. (g)

The protective overcoating copolyurethanes illustrated herein and formulated in accordance with the processes of the present invention can be characterized by various analytical techniques including spectroscopy, GPC, vapor pressure osmometry, and the like. Also, the copolyurethane overcoatings are applied to the imaging members disclosed hereinafter in a thickness that will enable the objectives of the present invention to be achieved. Generally, the thickness of this layer is from about 0.1 micron to about 10 microns, and preferably from about 1 micron to about 5 microns.

DESCRIPTION OF THE PREFERRED EMBODIMENTS

The invention will now be illustrated with reference to specific preferred embodiments wherein FIGS. 1 through 10 are formulas representing protective overcoating copolyurethanes;

Figure 11:
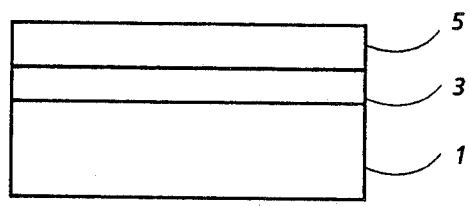
FIG. 11 represents a cross-sectional view of a photoresponsive imaging member of the present invention.

There is illustrated in FIG. 11 a photoresponsive imaging member of the present invention comprised of a supporting substrate 1, a photoconductive layer 3, and as a protective overcoating 5, the copolyurethanes illustrated herein.

Figure 3:
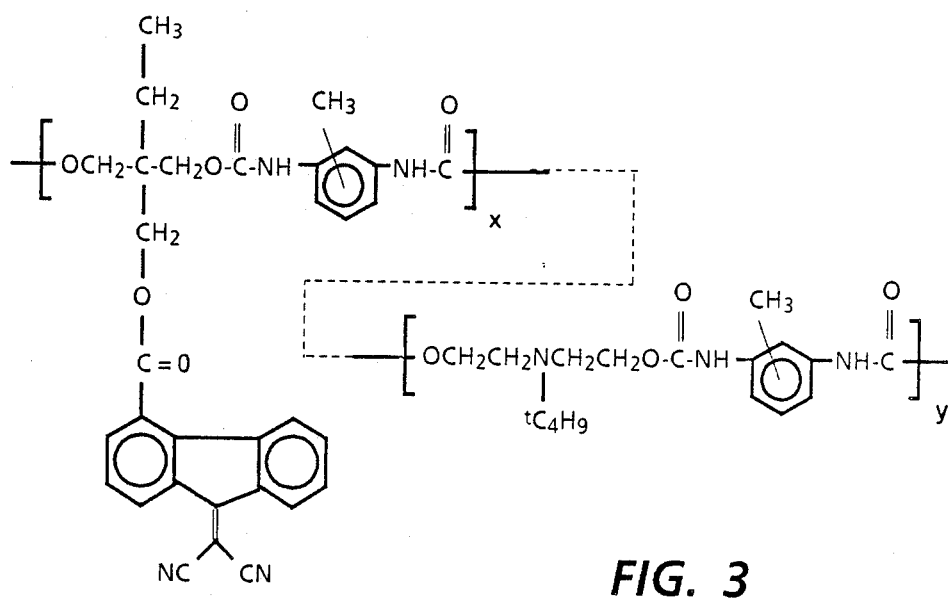
Figure 12:
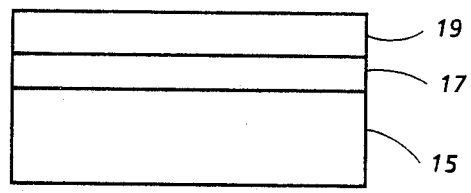
FIG. 12 represents a cross-sectional view of a preferred photoresponsive imaging member of the present invention.

Illustrated in FIG. 12 is a preferred photoresponsive imaging member of the present invention comprised of an aluminum supporting substrate 15, a selenium or selenium arsenic alloy photoconductive layer 17, and a top overcoating layer 19 comprised of the copolyurethane of FIG. 3 illustrated herein, and derived from the polycondensation of 2,2-bis (hydroxymethyl)butyl 9-dicyanomethylenefluorene-4-carboxylate and t-butyl bis(2-hydroxyethyl)amine with toluene diisocyanates.

Figure 1:
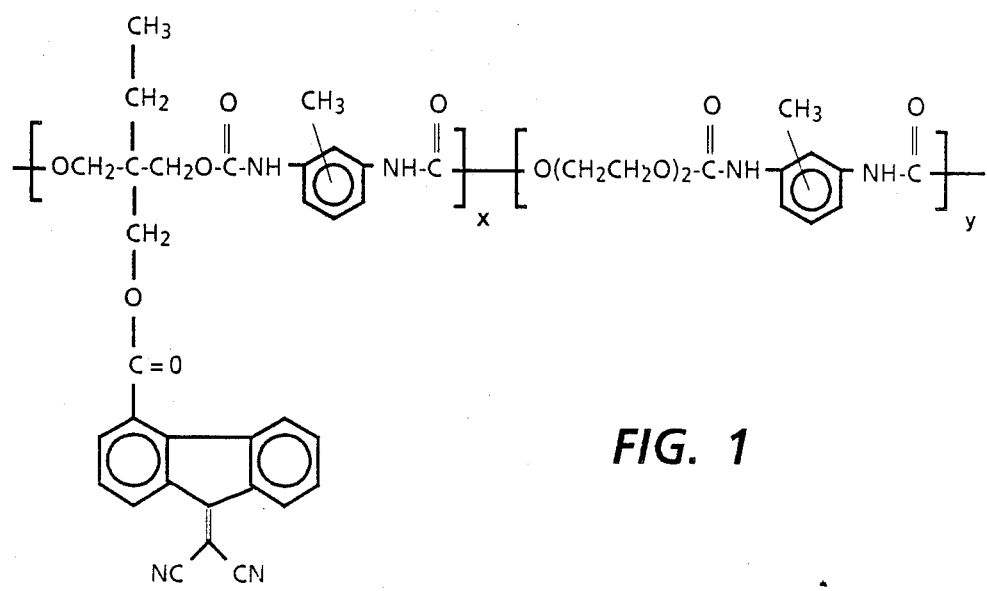
Figure 2:
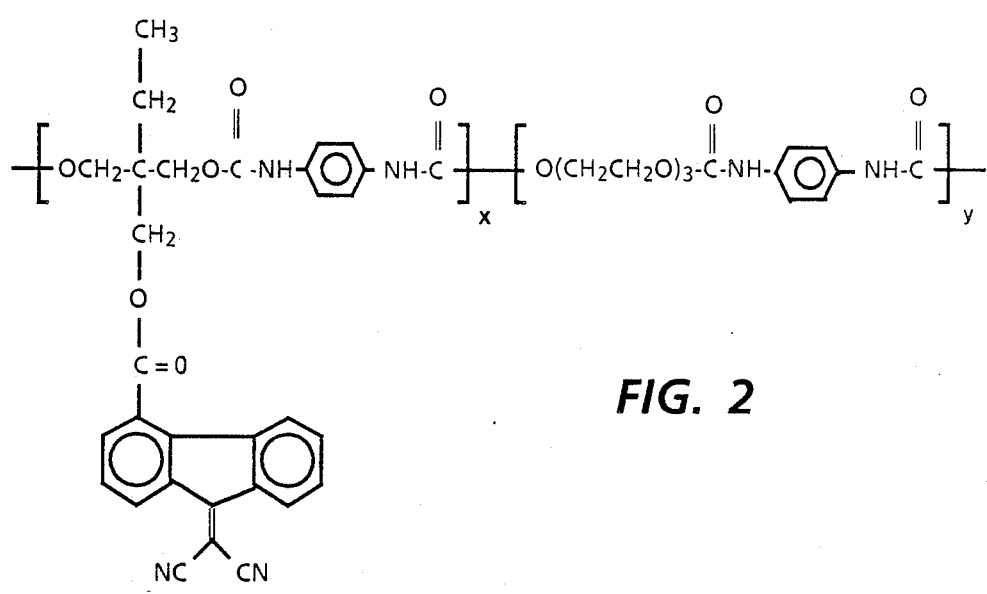
Figure 13:
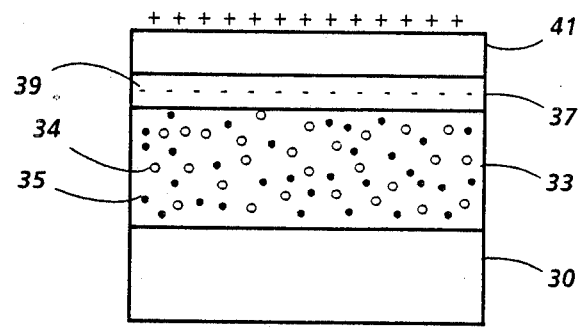
FIG. 13 represents a cross-sectional view of a preferred photoresponsive imaging member of the present invention.

Illustrated in FIG. 13 are positively charged layered photoresponsive imaging members comprised of a supporting substrate 30, an aryl amine hole transport layer 33, comprised of a diamine 34 such as N,N'-diphenyl-N,N'-bis(3-methylphenyl)1,1'-biphenyl-4,4'-diamine dispersed in an inactive resinous binder 35, a photogenerating layer 37 in contact therewith, optionally dispersed in a resinous binder 39, and a copolyurethane top overcoating layer 41 comprised of the copolyurethane of FIG. 1 illustrated herein.

Figure 14:
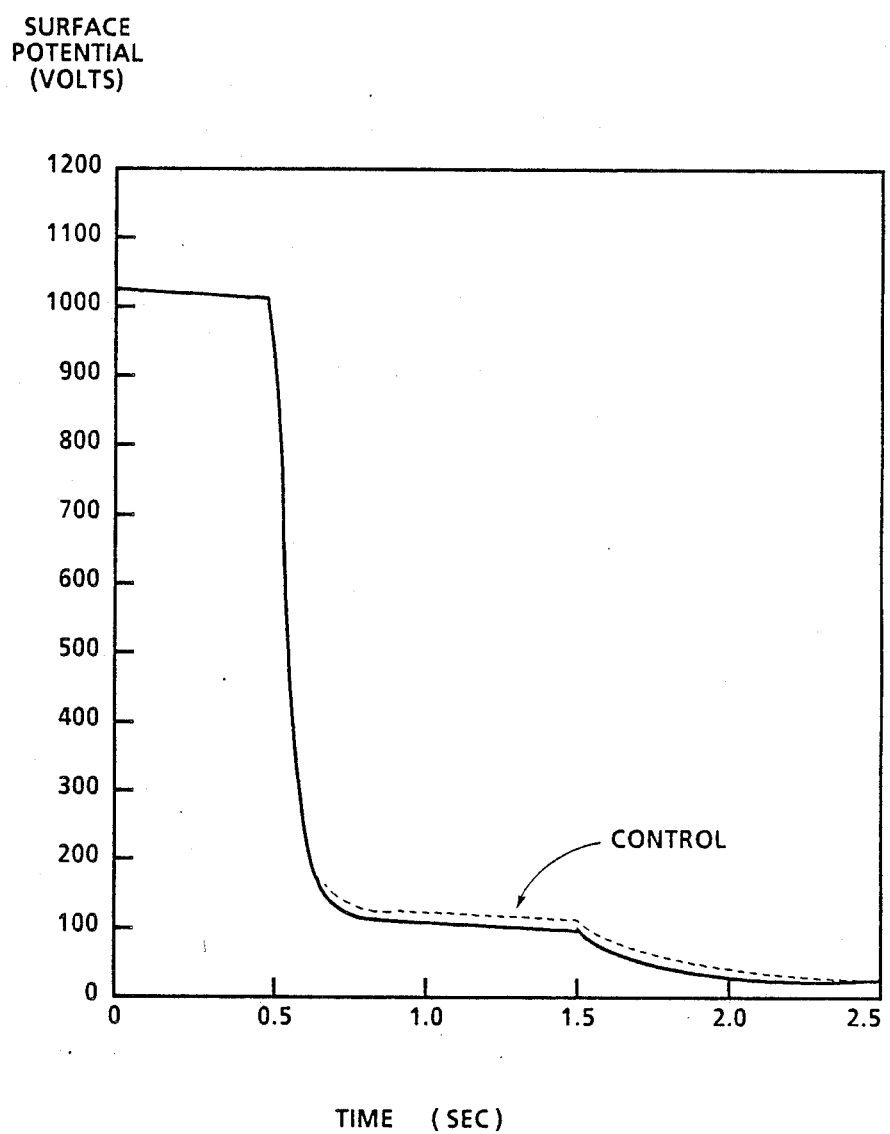
FIG. 14 represents line graphs for two photoresponsive imaging members.

With reference to FIG. 14, the solid line represents a photoinduced discharge curve for the photoresponsive member of FIG. 12 while the dotted line is a photoinduced discharge curve for the same photoresponsive member (control) with no copolyurethane overcoating thereon.

With further reference to the photoresponsive imaging members illustrated herein, and particularly with reference to FIGS. 11 to 13, the substrates layers may be comprised of any suitable material having the requisite mechanical properties. Thus, the substrate layers may be comprised of a layer of conductive materials such as metallized organic polymeric materials, or inorganic materials such as, for example, aluminum, chromium, nickel, brass, or the like. The substrate may be flexible or rigid, and may be of a number of many different configurations, such as, for example, a plate, a cylindrical drum, a scroll, an endless flexible belt, and the like. Preferably, the substrate is in the form of an endless flexible belt or a rigid drum.

Further, the photoconductive layers of FIGS. 11 and 12 can be comprised of known photoconductive materials including, for example, amorphous selenium, amorphous selenium alloys, halogen-doped amorphous selenium, halogen-doped amorphous selenium alloys, trigonal selenium, selenide and carbonates with trigonal selenium, reference U.S. Pat. Nos. 4,232,102 and 4,233,283, the disclosures of which are totally incorporated herein by reference; cadmium sulfide, cadmium selenide, cadmium telluride, cadmium sulfur selenide, cadmium sulfur telluride, cadmium seleno telluride, copper and chlorine-doped cadmium sulfide, and the like. Alloys of selenium included within the scope of the present invention are selenium tellurium alloys, selenium arsenic alloys, selenium tellurium arsenic alloys, and preferably such alloys containing selenium in an amount of from about 70 to about 99.5 percent by weight and an optional halogen material, such as chlorine, in an amount of from about 50 to about 200 parts per million.

With respect to FIG. 13, layered photoresponsive imaging members are envisioned wherein the photogenerating pigment is usually selected from organic substances such as vanadyl phthalocyanines, and the hole transport layer is selected from various arylamine molecules as illustrated herein, reference U.S. Pat. No. 4,265,990, the disclosure of which is totally incorporated herein by reference.

The photogenerating components of FIG. 13, generally of a thickness of 0.1 to about 5 microns, include metal phthalocyanines, metal-free phthalocyanines, vanadyl phthalocyanines, other known phthalocyanines as disclosed in U.S. Pat. No. 3,816,118, the disclosure of which is totally incorporated herein by reference; squarylium pigments, perylene derivatives, and the like.

Preferred photogenerating layers include squarylium pigments, perylene derivatives and vanadyl phthalocyanine.

With reference to FIGS. 11 and 12, the thickness of the substrate layers is generally from about 50 microns to about 5,000 microns, while the thickness of the photoconductive layer is from about 15 microns to about 50 microns, and the copolyurethane overcoating is of a thickness of from about 0.1 micron to about 10 microns, and preferably is of a thickness of from about 1 micron to about 5 microns.

Various hole transport layer compositions can be selected providing these substances are capable of transporting holes, this layer generally having a thickness in the range of from about 5 to about 50 microns, and preferably from about 20 to about 40 microns. Thus, the transport layer comprises aryl amine molecules of the formula

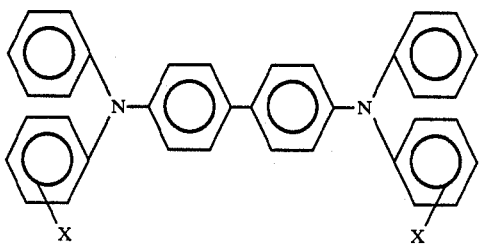

dispersed in a highly insulating and transparent organic resinous material such as polycarbonates and the like as illustrated in, for example, the U.S. Pat. No. 4,562,132 wherein X is selected from the group consisting of alkyl, and halogen; preferably methyl and chlorine. The charge transport layer is substantially nonabsorbing in the spectral region of intended use, that is, visible light, but is "active" in that it allows injection of photogenerated holes from the charge generator layer. Also, the resin becomes electrically active when it contains from about 10 to 75 weight percent of the substituted N,N,N',N'-tetraphenylbenzidine corresponding to the foregoing formula. Compounds corresponding to this formula include, for example, N,N'-diphenyl-N,N'-bis-(alkylphenyl)benzidine wherein alkyl is selected from the group consisting of methyl, ethyl, propyl, butyl, hexyl, and the like. With halogen substitution, the compound is N,N'-diphenyl-N,N'bis(halophenyl)benzidine.

Other electrically active small molecules which can be dispersed in the electrically inactive resin to form a layer which will transport holes include triphenylamine, and bis-(4-diethylamino-2-methylphenyl)-phenylmethane, and bis(4-diethylaminophenyl)-phenylmethane.

Several advantages are associated with the imaging members of the present invention inclusive of enabling the generation of images with excellent resolution, and no background deposits for an extended number of imaging cycles exceeding, for example 200,000; and moreover, the members, especially those containing selenium, or selenium alloys will not crystallize, and are insensitive to humidity. The crystallization of the photoconductive materials would have an adverse effect on their electrical performance, such as high dark conductivity and high residual potentials, resulting in poor copy quality such as faint images with high backgrounds. Also, the sensitivity of the imaging member to humidity and temperature would result in the copy quality dependent on the environmental conditions.

With further respect to the present invention, there are envisioned imaging and printing processes wherein, for example, an electrostatic latent image is generated on the imaging members illustrated herein, subsequently rendering the image visible with a toner composition comprised of toner resin particles such as styrene polymers, pigment particles such as carbon black, optional charge enhancing additives such as cetyl pyridinium chloride, optional external additives such as colloidal silicas and metal salts, and metal salts of fatty acids inclusive of zinc stearates; thereafter transferring the developed image to a suitable substrate such as paper; and permanently affixing the image thereto by, for example, heat or other similar processes.

The invention will now be described in detail with respect to specific preferred embodiments thereof, it being understood that these examples are intended to be illustrative only and the invention is not intended to be limited to the materials, conditions, and process parameters recited herein. All percentages and parts are by weight unless otherwise indicated.

EXAMPLE I

Synthesis of 2,2-bis(hydroxymethyl)butyl 9-dicyanomethylenefluorene-4-carboxylate(a)

A mixture of 2.1 kilograms of trimethylolpropane, 173 grams of fluorenone-4-carboxylic acid, and 8 milliliters of sulfuric acid was mechanically stirred and heated in a 5-liter flask at 100° C. for 5 hours. The mixture was cooled to about 80° C., and 1 liter of methanol was added. Thereafter, the resulting solution was poured slowly into 17 liters of 3 percent aqueous sodium bicarbonate solution with constant stirring, and the crude product resulting was filtered, washed several times with water, and dried. Purification by recrystallization from ethyl acetate afforded 187 grams of pure 2,2-bis(hydroxymethylbutyl) fluorenone-4-carboxylate, mp., 134° to 135.5° C.

A solution of 240 grams of the ester as obtained above, 93 grams of malononitrile, and 5 milliliters of piperidine in 2.3 liters of absolute methanol was heated under reflux in a nitrogen atmosphere for 5 hours. After the reaction, the mixture was cooled to about 50° C., and the solid product was filtered. The product obtained of Formula (a) was washed twice with methanol, dried in vacuo at 100° C. to afford 229 grams of pure (a), mp., 208° to 209° C.

Analysis Calculated for $C_{23}H_{20}N_2O_4$: C, 71.12; H, 5.19; N, 7.12. Found: C, 71.23; H, 5.21; N, 7.13.

IR (KBr), $cm^{-1}$: 3420; 2230; 1730.

$^1$H MNR (DMSO-$d_6$), ppm: 0.85 (t, 3H); 1.4 (q, 2H); 3.4 (d, 4H); 4.3 (s, 2H); 4.4 (t, 2H); 7.4–8.6 (m, 7H).

EXAMPLE II

Synthesis of 3,5-dihydroxyphenyl 9-dicyanomethylenefluorene-4-carboxylate(b)

A solution of 30.0 grams of phloroglucinol and 70 milliliters of pyridine in 300 milliliters of dichloromethane was stirred at room temperature under a nitrogen atomosphere. Thereafter, a solution of 8.0 grams of (4-chloroformyl-9-fluorenylidine)malononitrile in 400 milliliters of dichloromethane was added thereto over a period of 1 hour. After addition, the reaction mixture was stirred for another hour. The mixture was washed three times with dilute aqueous HCl solution, twice with dilute aqueous NaHCO$_3$ solution, and once with water. The solution was dried, filtered, and evaporated under reduced pressure to give the crude product. Recrystallization from methanol afforded 6.1 grams of (b), mp., 255.5° to 257° C.

Analysis Calculated for C$_{23}$H$_{12}$N$_2$O$_4$: C, 72.63; H, 3.18; N, 7.37. Found: C, 72.41; H, 3.12; N, 7.17.

IR (KBr), cm$^{-1}$: 3410; 2230; 1730.

$^1$H MNR (acetone-d$_6$), ppm: 3.25(brs, 2H); 6.8(s, 3H); 7.6-9.0 (m, 7H).

EXAMPLE III

Synthesis of 2-[bis(2-hydroxyethyl)amino]ethyl 9-dicyanomethylene fluorene-4-carboxylate(c)

A solution of 100.0 grams of triethanolamine and 58 milliliters of dry pyridine in 350 milliliters of dry dichloromethane was stirred at room temperature under a nitrogen atomosphere. Thereafter, a solution of 8.0 grams of (4-chloroformyl-9-fluorenylidene)malononitrile in 400 milliliters of dry dichloromethane was added over a period of 1 hour. After addition, the reaction mixture was further stirred for another hour. The reaction mixture was washed several times with water to remove the excess amines and the corresponding hydrochloride salts, dried with anhydrous magnesium sulfate and filtered. Evaporation of the filtrate provided 5 grams of crude product. Purification by recrystallization from isopropanol afforded 4.5 grams of pure (c), mp., 155.5° to 156.5° C.

Analysis Calculated for C$_{23}$H$_{21}$N$_3$O$_4$: C, 68.48; H, 5.25; N, 10.42. Found: C, 68.31; H, 5.33; N, 10.35.

IR (KBr), cm$^{-1}$: 3360; 2225; 1730.

$^1$H MNR (DMSO-d$_6$), ppm: 2.6 (t, 4H); 2.8 (t, 2H); 3.25 (br s, 2H); 3.4 (t, 4H); 4.4 (t, 2H); 7.4-8.6 (m, 7H).

Other hydroxy carboxylates can be prepared in a manner similar to Examples I and III.

EXAMPLE IV

Synthesis of Copolyurethane (FIG. 1, x=0.5; y=0.5)

A mixture of 0.030 mole of diol monomer (a), 0.030 mole of diethylene glycol, 0.063 mole of toluene diisocyanates (mixture of 2,4- and 2,6-diisocyanates), and 0.05 gram of dibutylin dilaurate was dissolved in 100 milliliters of dried dimethyl sulfoxide. The mixture was heated under an inert atmosphere at 70° to 75° C. for 4 hours, after which 5 milliliters of ethanol were added. Thereafter, the reaction mixture was heated for another hour before cooling down to room temperature. This mixture was then poured slowly into 3 liters of swirling methanol to precipitate the resultant polyurethane. The polyurethane product was filtered and washed twice with 500 milliliters of methanol. The yield of the above copolyurethane (I) was 86 percent after drying in vacuo at 65° C. for 24 hours; DP (degree of polymerization) was 103; Tg 121° C. (mid-point); IR (KBr) 1,729; 2,221 cm$^{-1}$.

EXAMPLE V

Synthesis of Copolyurethane (FIG. 1, x=0.6; y=0.4)

Copolyurethane of FIG. 1 above was prepared according to the procedure of Example (IV) except that 0.036 mole of diol monomer (a), 0.024 mole of diethylene glycol, and 0.063 mole of toluene diisocyanates were employed; and the reaction was conducted for 6 hours. The yield was 88 percent; DP 112; and Tg 134° C. IR (KBr) 1,730; 2,221 cm$^{-1}$.

EXAMPLE VI

Synthesis of Copolyurethane (FIG. 3, x=0.5; y=0.5)

A mixture of 0.150 mole of diol monomer (a), 0.150 mole of t-butyl bis(2-hydroxyethylamine), and 0.316 mole of tolylene diisocyanates, and 0.2 gram of dibutyltin dilaurate in 700 milliliters of dried dimethylsulfoxide was heated under a nitrogen atmosphere at 70° to 75° C. for 10 hours. Subsequently, 10 milliliters of absolute ethanol was added and the reaction was continued at the same temperature for another hour. After cooling down to room temperature, the reaction mixture was poured into 5 liters of methanol to precipitate the above polyurethane product. The precipitate was filtered, washed with methanol, and dried in vacuo at 60° C. for 24 hours. The yield of the above copolyurethane was 91 percent; DP 121; and Tg 134° C.; IR (KBr) 1,730; 2,222 cm$^{-1}$.

EXAMPLE VII

Figure 4:
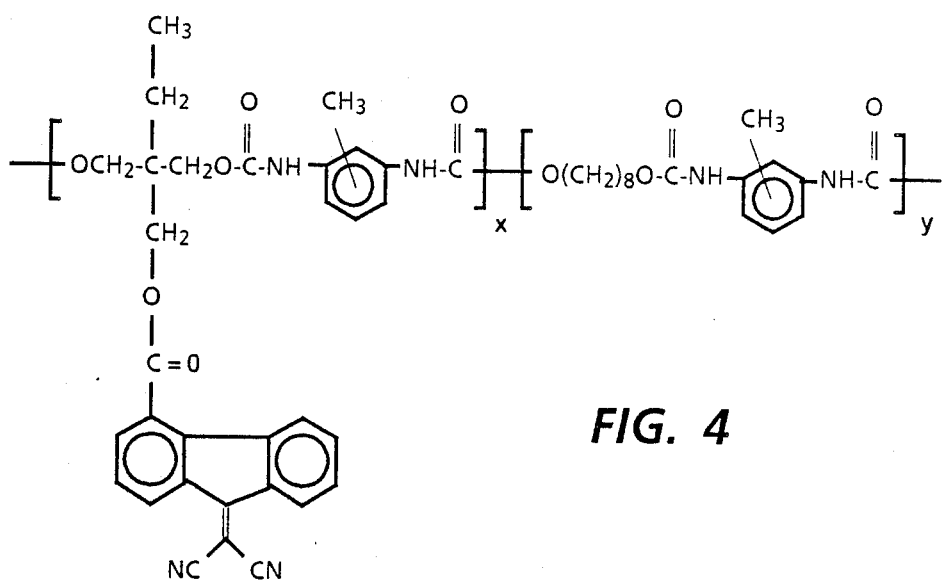
Figure 5:
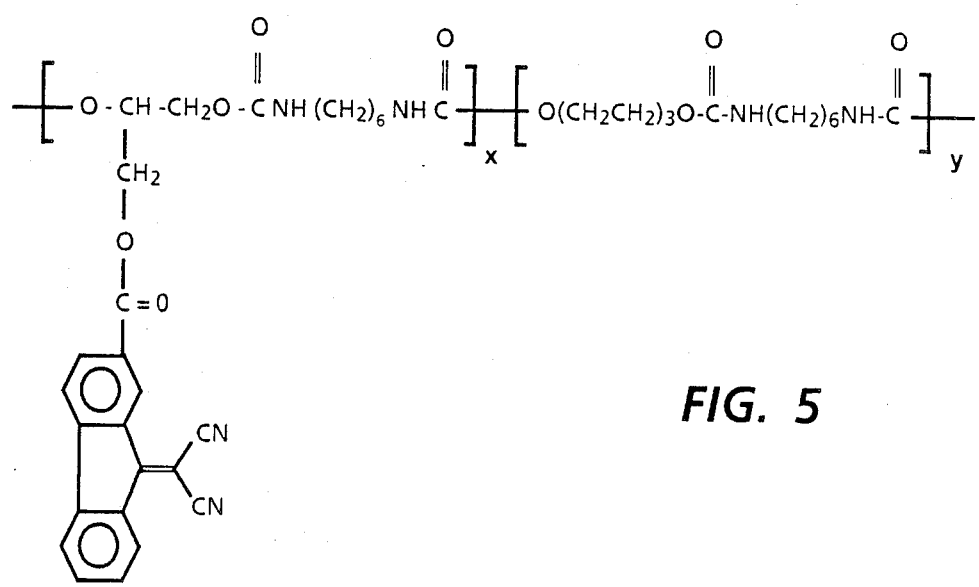

Synthesis of Copolyurethane (FIG. 4, x=0.5; y=0.5)

The synthesis of the above copolyurethane was accomplished in accordance with the procedure of Example VI with a mixture of 0.030 mole of diol monomer (a), 0.030 mole of 1,8-octanediol, 0.063 mole of toluene diisocyanates, and 0.05 gram of dibutyltin dilaurate. The yield of the above copolyurethane was 84 percent; DP 99; Tg 118° C.; IR (KBr) 1,730; 2,222 cm$^{-1}$.

EXAMPLE VIII

Figure 6:
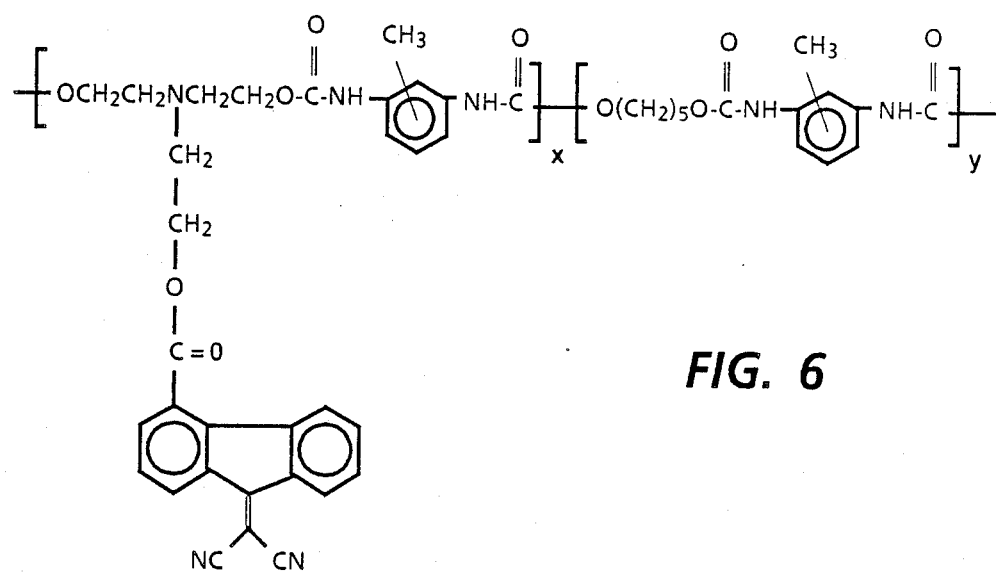
Figure 7:
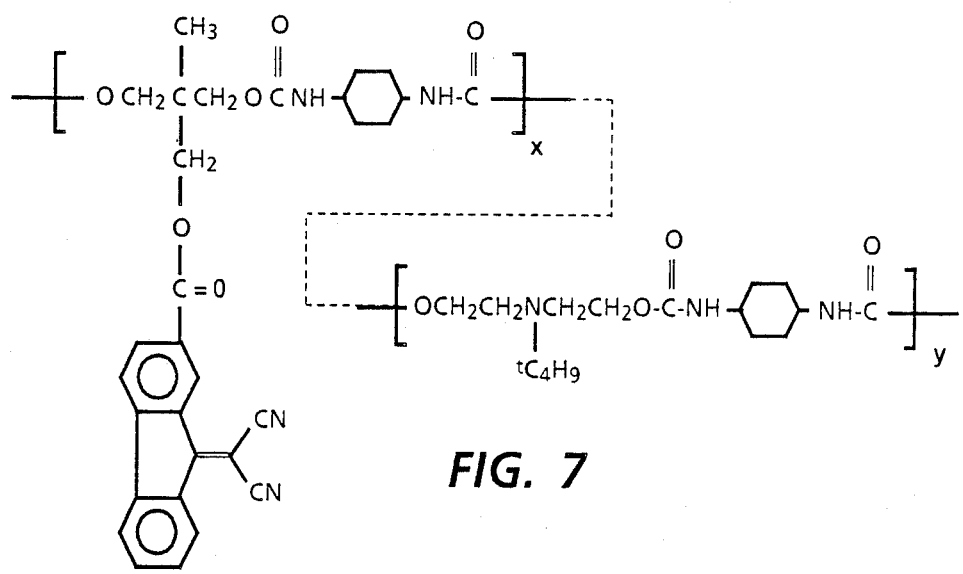

Synthesis of Copolyurethane (FIG. 6, x=0.6 y=0.4)

The synthesis of copolyurethane was accomplished in accordance with the procedure of Example IV with monomer (c), 1,5-pentanediol and toluene diisocyantes except that the reaction was conducted in dry dimethylformamide. The yield of the above copolyurethane was 92 percent; DP 103; Tg 107° C.; IR (KBr) 1,730; 2,222 cm$^{-1}$.

EXAMPLE IX

Figure 8:
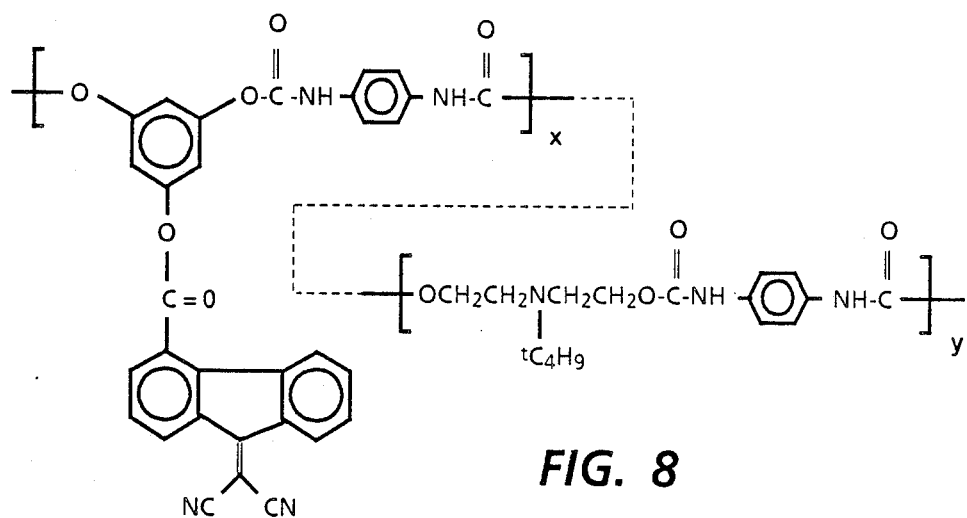
Figure 9:
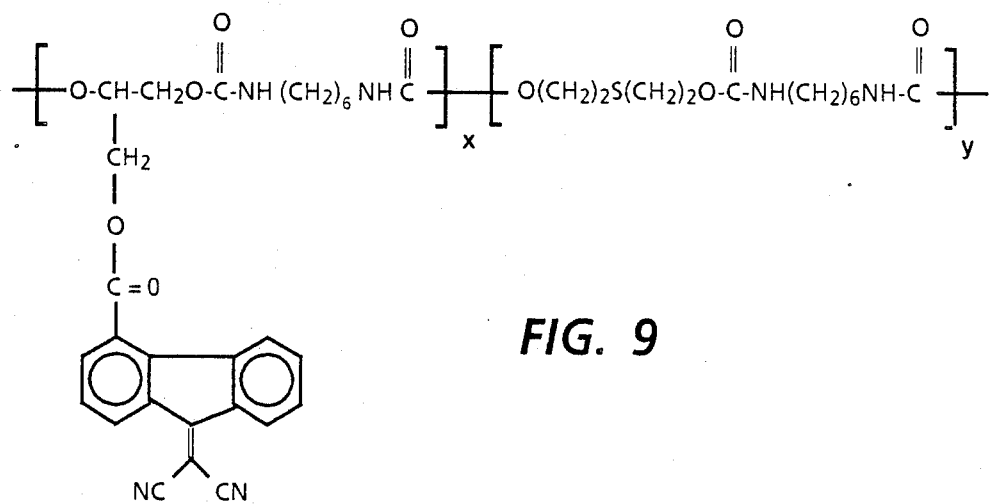
Figure 10:
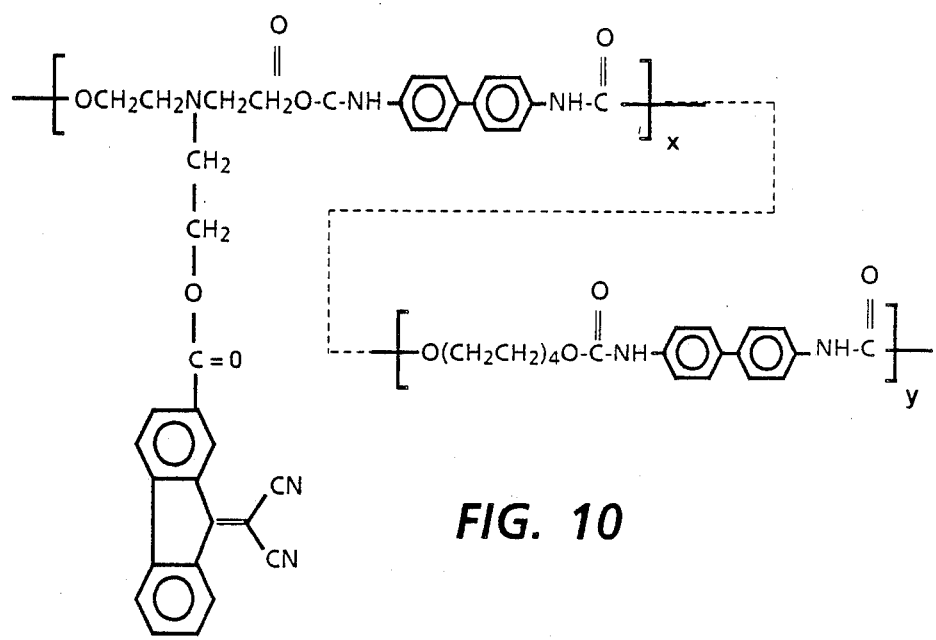

Synthesis of Copolyurethane (FIG. 8, x=0.7; y=0.3)

The synthesis of the above copolyurethane was accomplished in accordance with the procedure of Example V with 0.042 mole of diol monomer (b), 0.018 mole of t-butyl bis(2-hydroxyethyl)amine, 0.063 mole of 1,4-benzenediisocyanate, and 0.05 gram of dibutyltin dilaurate. The reaction was conducted in dried tetrahydrofuran, and the yield of the above copolyurethane was 87 percent; DP 89; Tg 138° C.; IR (KBr) 1,730; 2,222 cm$^{-1}$.

EXAMPLE X

A photoresponsive imaging member comprising a nickel plate substrate coated with an alloy of selenium arsenic with 99.5 percent of selenium, and doped with 100 ppm of chlorine was overcoated with a layer of copolyurethane obtained from Example IV. The solution for the overcoating was prepared by dissolving 2.0 grams of copolyurethane in 35 milliliters of tetrayhydrofuran. This solution was coated over the selenium alloy layer by means of a Bird Film applicator. The coating was then dried in a forced air oven at 50° C. for 60 minutes, and an overcoat of a dry thickness of 2.0 microns was obtained. Subsequently, the fabricated photoresponsive imaging member was cooled to room temperature and electrically tested as follows:

The member was charged positively with corona, and discharged by exposing to white light of wavelengths of 400 to 700 nanometers. Charging was accomplished with a single wire corotron in which the wire was contained in a grounded aluminum channel, and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder and placed directly above the photoreceptor member surface. This loop was capacitively coupled to the photoreceptor surface so that the voltage of the wire loop corresponds to the surface potential. Also, the cylinder enclosing the wire loop was connected to the ground. For this imaging member, the acceptance was 1,200 volts, the residual potential was 100 volts, and the half decay exposure sensitvity was 10 ergs/cm$^2$. Further, the electrical properties of this photoreceptor member were essentially the same after 1,000 cycles of repeated charging and discharging. Specifically, the electrical stability of the photoreceptor member was tested by monitoring the surface potentials for 1,000 cycles. Xerographic cycling is essentially the repetition of a photoinduced discharge experiment for a specific number of cycles. Each photoinduced discharge experiment constitutes a single cycle, and typically an individual cycle will include charging, a dark decay period, exposure, a discharge period, and erasure by light of the remaining charge on the photoreceptor surface.

EXAMPLE XI

Two substantially identical organic photoresponsive imaging members were fabricated by coating a charge transport layer of a thickness of 15 microns on an aluminized Mylar substrate of a thickness of 50 microns. The transport layer was comprised of 50 percent of N,N'-diphenyl-N,N'-bis(3-methylphenyl)benzidine dispersed in 50 percent by weight of Makrolon polycarbonate. Photogenerator layers, 0.5 micron in thickness, comprising 30 percent of vanadyl phthalocyanine dispersed in 70 percent by weight of polyester PE-100, available from Goodyear, were spray coated on the aforementioned transport using a commercial spray gun. One of these fabricated imaging members was overcoated with a layer of copolyurethane prepared in accordance with the procedure of Example V. The thickness of the overcoat was 2 microns. The other fabricated imaging member was not overcoated and served as a control.

These two devices were then tested electrically by positively charging to a surface potential of about 950 volts, and discharging by exposing to 830 nanometers monochromatic light. The results indicated that both devices possessed a similar acceptance potential and similar exposure sensitivity. However, the overcoated device displayed a dramatic improvement in its dark decay characteristics as compared to the control device as follows:

|  | Acceptance Potential (Volts) | Dark Decay (Volts/sec.) | Half-Decay Exposure Sensitivity (ergs/cm$^2$) |
| --- | --- | --- | --- |
| Control Device | 950 | 200 | 15 |
| Overcoated Device | 950 | 45 | 15 |

EXAMPLE XII

A photoresponsive imaging member was prepared by coating an aluminum drum, 500 microns thick, with a photoconductive layer of an arsenic selenium alloy, 99.5 percent selenium doped with 100 parts of chlorine. This imaging member was then overcoated with a copolyurethane overcoating by the spray coating technique as follows:

A solution for the overcoating was prepared by dissolving 6.0 grams of copolyurethane obtained from Example VI in 120 milliliters of methylene chloride and 80 milliliters of 1,1,2-trichloroethane. This solution was spray coated onto the aforementioned photoresponsive imaging drum using a commercial spray gun (Brinks Model 21) in a humidity and temperature-controlled housing. The relative humidity was maintained at 35 percent, and the temperature at 20° C. during spraying. The overcoated drum was then dried in a forced air oven at 50° C. for 90 minutes affording a 2.5 microns thick copolyurethane overcoating.

The overcoated drum thus obtained was subject to print testing in a Xerox 2830® copier at a relative humidity range of 20 percent to 70 percent, and temperature range of 10° C. to 30° C. A total of 30,000 copies were produced from this overcoated imaging member. Several test patterns were used to monitor the image quality of the copies, which image quality was excellent as evidenced by the high resolution with no image blurring and no image deletion, and clean background. No visual defects on the polyurethane ovecoating were detected.

EXAMPLE XIII

A photoresponsive imaging member comprising a ball grained aluminum plate of a thickness of 40 mils coated with a 60 microns thick layer of a selenium tellurium alloy (75/25) was overcoated with a layer of copolyurethane obtained from Example VII as follows:

A solution for the overcoating was prepared by dissolving 4.0 grams of the above copolyurethane in 50 milliliters of methylene chloride. The solution was coated over the selenium-tellerium photoconductive layer by means of a Bird Film applicator. Subsequently, the coating was dried in a forced air oven at 50° C. for 30 minutes resulting in a thickness of 1.5 microns. The overcoated photoresponsive imaging member was electrically tested in accordance with the procedure of Example X, and substantially similar imaging results were obtained.

EXAMPLE XIV

A photoresponsive imaging member similar to that of Example XI with the exception that the ball grained aluminum plate of Example XIII was selected. Specifically, a photogenerator layer comprising trigonal selenium and the diamine of Example XI dispersed in poly(N-vinylcarbazole) was coated on top of the diamine transport layer. The thickness of the transport layer was 25 microns and that of the photogenerator was 2 microns. An overcoat layer of the copolyurethane obtained from Example VI was applied on top of the photogenerator layer by means of a Bird Film applicator. Electrical testing of this device was accomplished by repeating the procedure of Example X, and substantially similar results were obtained.

Although the invention has now been described with reference to specific preferred embodiments, it is not intended to be limited thereto but rather those of ordinary skill in the art will recognize that variations and modifications, including equivalents thereof, may be made therein which are within the spirit of the invention and within the scope of the claims.

What is claimed is:

1. An imaging member comprised of a photoconductive layer, and a protective copolyurethane coating of the formula:

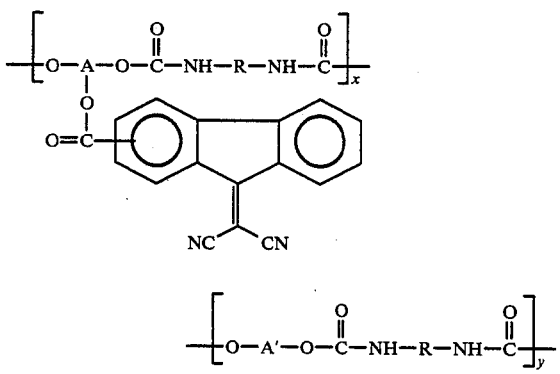

wherein A is a trivalent group; A' is a bivalent group; R is selected from the group consisting of alkylene, substituted alkylene, arylene, and substituted arylene; x and y are number mole fractions of from about 0.05 to about 0.95 subsequent to the provision that the sum of x+y is equal to 1.0.

2. An imaging member in accordance with claim 1 wherein the photoconductive layer is comprised of selenium.

3. An imaging member in accordance with claim 1 wherein the photoconductive layer is comprised of a selenium alloy.

4. An imaging member in accordance with claim 3 wherein the alloy is selenium arsenic, or selenium tellurium.

5. An imaging member in accordance with claim 1 wherein the trivalent group A contains from 4 to about 20 carbon atoms.

6. An imaging member in accordance with claim 1 wherein A is 2,2-dimethylene butyl.

7. An imaging member in accordance with claim 1 wherein A is 2,2-dimethylene propyl.

8. An imaging member in accordance with claim 1 wherein A is 2,2-dimethylene ethyl.

9. An imaging member in accordance with claim 1 wherein A is triethylene amine.

10. An imaging member in accordance with claim 1 wherein R is an arylene group of from 6 to about 24 carbon atoms.

11. An imaging member in accordance with claim 1 wherein R is a alkylene group of from 1 to about 20 carbon atoms.

12. An imaging member in accordance with claim 1 wherein R is hexamethylene.

13. An imaging member in accordance with claim 1 wherein R is phenylene.

14. An imaging member in accordance with claim 1 wherein R is tolylene.

15. An imaging member in accordance with claim 1 wherein the bivalent group A' contains heteroatoms selected from the group consisting of nitrogen, oxygen, and sulfur.

16. An imaging member in accordance with claim 1 wherein A' is $-CH_2CH_2OCH_2CH_2-$.

17. An imaging member in accordance with claim 1 wherein A' is $-CH_2CH_2OCH_2CH_2OCH_2CH_2-$.

18. An imaging member in accordance with claim 1 wherein A' is $-CH_2CH_2N(t-C_4H_9)CH_2CH_2-$.

19. An imaging member in accordance with claim 1 wherein A' is $-CH_2CH_2SCH_2CH_2-$.

20. An imaging member in accordance with claim 1 wherein the bivalent group A' is an alkylene of from 2 to about 20 carbon atoms.

21. An imaging member in accordance with claim 1 wherein A' is $-(CH_2)_n-$ wherein n is a number of from about 2 to about 20.

22. An imaging member in accordance with claim 1 wherein A' is $-CH_2C(CH_3)_2CH_2-$.

23. An imaging member in accordance with claim 1 wherein A' is $-CH_2C_6H_{10}CH_2-$.

24. An imaging member in accordance with claim 1 wherein the copolyurethane is selected from the group consisting of those represented by the formulas of FIGS. 1, 2, 3, 4, 5, 6, 7, 8, 9, and 10.

25. An imaging member in accordance with claim 1 containing a supporting substrate.

26. An imaging member comprised of supporting substrate, a photogenerating layer comprised of a photogenerating pigment optionally dispersed in a resinous binder, an aryl amine hole transport layer, and as a protective overcoating the copolyurethanes of claim 1.

27. An imaging member in accordance with claim 26 wherein the photogenerating pigment is selected from the group consisting of metal phthalocyanines and metal free phthalocyanines.

28. An imaging member in accordance with claim 26 wherein the hole transporting layer contains molecules of the formula

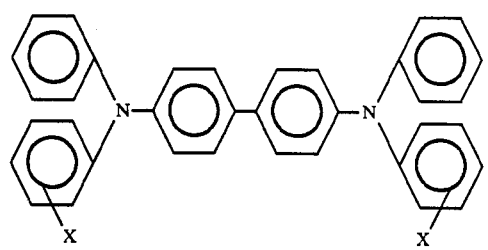

wherein X is an alkyl group, or halogen atom.

29. An imaging member in accordance with claim 26 wherein the overcoating is the copolyurethanes represented by FIG. 1.

30. An imaging member in accordance with claim 26 wherein the overcoating is the copolyurethane represented by FIG. 3.

* * * * *